Dec. 18, 1951 K. SCHLESINGER 2,579,014

SAWTOOTH CURRENT GENERATOR

Filed Dec. 4, 1947 2 SHEETS—SHEET 1

INVENTOR.
Kurt Schlesinger

BY

Foorman L. Mueller

Atty.

INVENTOR.
Kurt Schlesinger
BY
Foorman L. Mueller
Atty.

Patented Dec. 18, 1951 2,579,014

UNITED STATES PATENT OFFICE 2,579,014

SAW-TOOTH CURRENT GENERATOR

Kurt Schlesinger, Maywood, Ill., assignor to Motorola, Inc., Chicago, Ill., a corporation of Illinois Application December 4, 1947, Serial No. 789,672

12 Claims. (Cl. 315—27)

This invention relates generally to apparatus for producing current of sawtooth wave form and more particularly to a scanning generator for producing current of sawtooth wave form in the deflecting coils of a television receiver.

In television receivers in which the electron beam of the cathode ray tube is deflected by moving magnetic fields, it is necessary that a generator be provided for producing high frequency sawtooth current waves for causing horizontal scanning of the cathode ray beam. For such use it is highly desirable that the current generator be small, simple, inexpensive, efficient and at the same time provide a linear trace. The deflection system and power supply required therefor are to a large extent responsible for the relatively large size of presently available television receivers using magnetic deflection.

It is, therefore, an object of the present invention to provide an improved sawtooth current generator which is of simple and inexpensive construction.

A further object of this invention is to provide a sawtooth current generator which does not require a transformer and which produces a linear trace.

A feature of the present invention is the provision of a current generator for providing a sawtooth current in an inductive load including an efficiency diode across the load and in which there is provided a high impedance choke for supplying a differential current so that the current in the load is of sawtooth wave form.

A further feature of this invention is the provision of a sawtooth current generator including an efficiency diode with a choke including a pair of bifilar windings for providing heater current to the diode thereby eliminating special insulating means.

Further objects, features and advantages will be apparent from a consideration of the following description taken in connection with the accompanying drawings in which.

In practicing the invention there is provided an improved sawtooth current generator which is suitable for use as the horizontal scanning generator in a television receiver. The generator includes a blocking oscillator including an auto transformer having portions in the input and output circuits of a triode valve to provide feedback therebetween. The oscillator is adapted to be controlled by synchronization pulses as, for example, the line synchronization pulses of a television receiver. The blocking oscillator produces a sawtooth voltage wave which is applied to a pentode, the output electrodes of which are connected to the horizontal deflecting coils of a television receiver. An efficiency diode is connected across the deflecting coils in a well known manner. A high impedance choke is also connected across the deflecting coils to provide a path for a differential current which shifts the axis of the currents to provide a linear trace. The choke may be in the form of a pair of bifilar windings so that in addition to providing differential current for the coils, it may also be used to provide heater current for the efficiency diode.

Figure 1:
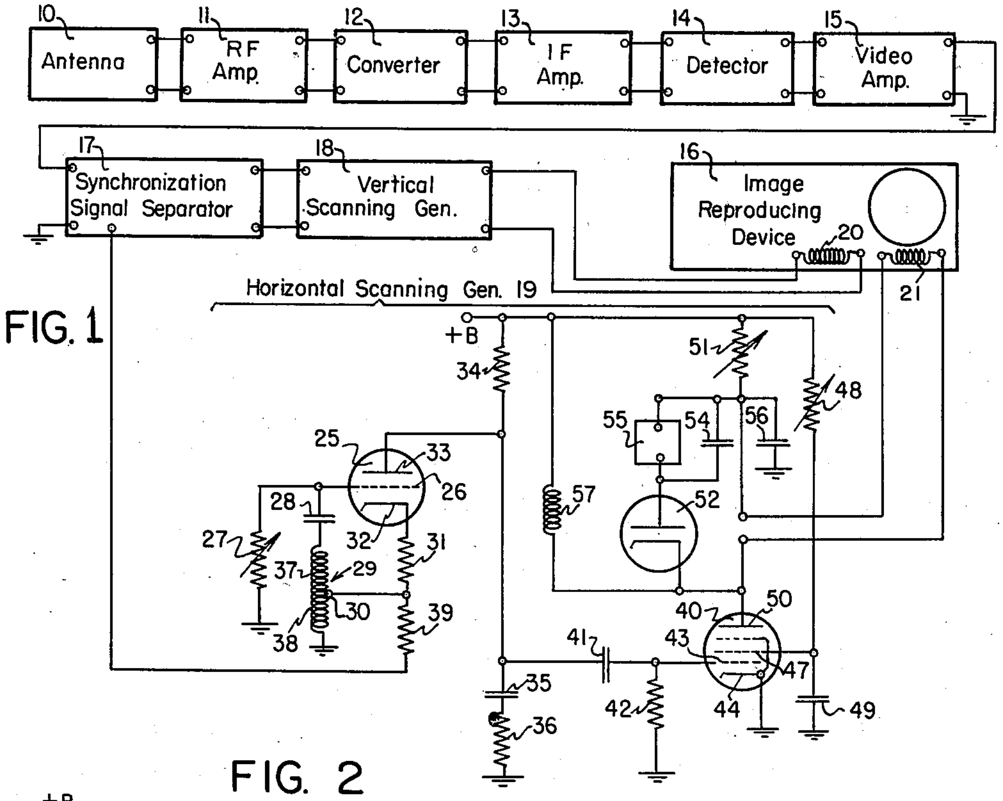
Fig. 1 illustrates a television receiver including the sawtooth current generator in accordance with the invention.

Referring now to the drawings, in Fig. 1 there is illustrated a television receiver utilizing the sawtooth current generator in accordance with the invention. The receiver includes an antenna system 10 for intercepting radio frequency signals and applying the signals of the desired frequency to radio frequency amplifier 11. The signals are further selected and amplified and then applied to converter 12 wherein they are converted into signals of intermediate frequency. The intermediate frequency signals are selected and amplified in intermediate frequency amplifier 13 and applied to detector 14 wherein the video signals are derived from the intermediate frequency wave. The composite video signals are applied to video amplifier 15 wherein they are amplified and then furnished to image reproducing device 16 and synchronization signal separator 17.

The image reproducing device 16 includes means for producing a beam of electrons and control means for varying the intensity of the beam. The video signal is applied to the control means so that the intensity of the beam is controlled in accordance with the instantaneous amplitude of the video signal. The synchronization signal separator 17 derives the synchronization signals from the composite video signal and separates the signals, with the vertical synchronization signals being applied to vertical scanning generator 18 and the horizontal synchronization signals being applied to horizontal scanning generator 19. The scanning generators produce sawtooth current waves which are applied to the vertical and horizontal deflecting coils 20 and 21, respectively, of image reproducing device 16. The coils thereby produce moving magnetic fields for deflecting the beam of the image reproducing device so that it scans a rectilinear pattern on the screen. An audio system may also be included in the television receiver and may be provided in any one of a plurality of well known manners. As the invention does not relate to the audio system, such system will not be further described.

The sawtooth current generator in accordance with the invention, which is used as the horizontal scanning generator 19 of Fig. 1, will now be described. This generator includes a triode 25 which functions as a blocking oscillator. The triode includes a grid 26 biased by variable resistor 27 and coupled through condenser 28 to auto transformer 29. The auto transformer 29 includes a tap 30 which is connected through resistance 31 to the cathode 32 of the triode. The plate 33 of the triode is connected to a source of plus B potential through resistor 34 which is by-passed by a series circuit including condenser 35 and resistor 36. It is, therefore, seen that the upper portion 37 of the transformer 29 is in the grid circuit and the lower portion 38 of the transformer is in the output circuit of the oscillator. The two portions of the transformer are in inductive relation so that feedback is provided from the output to the input of the triode. The oscillator may be held in step with synchronization pulses applied to the cathode 32 through decoupling resistor 39. The coupling resistor 39 may be replaced by a small coupling condenser as indicated by 53 in Fig. 2.

The sawtooth voltage wave from the blocking oscillator is applied to the grid 43 of amplifier tube 40 through coupling condenser 41 and bias resistor 42. The cathode 44 of the pentode is connected to ground, and the screen grid 47 is connected to plus B through resistor 48 and is by-passed by condenser 49. Resistor 48 is variable to provide a control of the output current and thereby control the horizontal size. This provides an efficient control which does not introduce distortion. The plate 50 of the pentode is connected to the deflecting coils 21 of the receiver, being connected through variable resistor 51 to the plus B voltage. The pentode 40 conducts only during a portion of the cycle and to provide a return path for energy stored in the inductive deflecting coils when the pentode 40 is non-conducting, an efficiency diode 52 is connected across the coils 21. Connected in series with diode 52 are condenser 54 and load 55 which are connected in parallel. The load 55 may be a resistor, or, as will be further explained, may be the focus coil of the cathode ray tube. Condenser 56 is provided to furnish a radio frequency by-pass.

Figure 6:
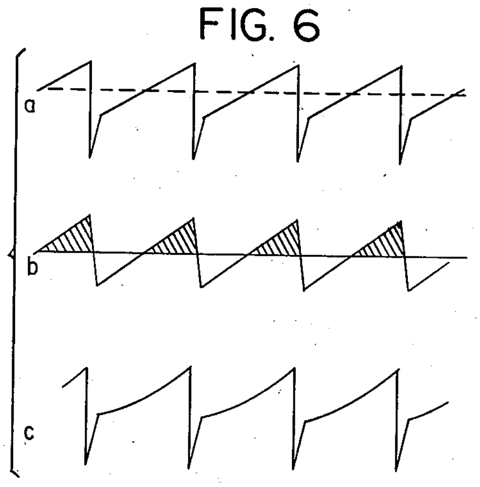
Fig. 6 is a curve chart illustrating wave forms encountered in the generators.

In Fig. 6 curves illustrating the operation of the generator 19 are shown. Curve *a* represents the voltage wave applied to the grid 43 of tube 40. The dotted line illustrates the voltage input required to render the tube 40 conducting. It is seen that the tube 40 conducts only a part of the time to provide current in the deflecting coils as shown by the shaded portion of curve *b*.

The discharge current through the diode 52 when the pentode 40 is not conducting provides the negative part of the current wave. It has been found that in such circuits, the charge current through amplifier tube 40 and the discharge current through the diode 52 are unequal thereby providing a sawtooth wave having a discontinuity in the rising portion thereof. For satisfactory deflection it is necessary that the rising or trace portion of the scanning current be completely smooth and linear. By providing a choke 57 having high impedance as compared to the coils 21 across the deflecting coils 21, and by proper adjustment of positioning resistor 51, it has been found that the direct current axis can be established so that the sawtooth wave will be entirely linear. The direct current axis can, therefore, be controlled by varying the resistor 51 to provide the amount of the horizontal shift required. For best results, the impedance of the choke 57 must be of the order of ten times that of the deflecting coils. Such a choke provides a differential current which cancels the picture shift due to losses in the deflecting coils.

Figure 2:
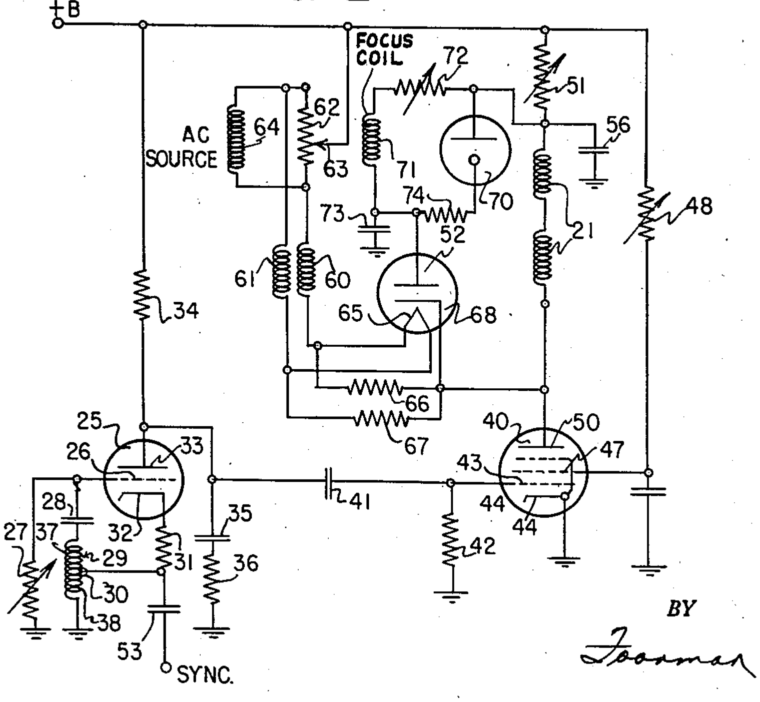
Fig. 2 is a circuit diagram of a modified current generator.
Figure 3:
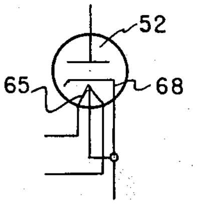
Fig. 3 shows the connection of a diode having a center tapped heater coil in the circuit of Fig. 2.

In Fig. 2 there is illustrated a modified current generator which is generally similar to the horizontal scanning generator 19 of Fig. 1. The circuit in Fig. 2 differs, however, in two respects. First, the choke 57 of Fig. 1 is replaced by a pair of bifilar coils 60 and 61. These coils are connected to resistor 62 to which a source of A. C. power is applied through winding 64. A movable tap 63 is provided on the resistor 62 which is connected to the plus B power supply. The windings 60 and 61 are connected to the heater 65 of the diode 52 and are also connected through resistors 66 and 67 to the cathode 68 of the diode. Therefore, it is seen that the voltage appearing on resistor 62 is applied through the windings in series to the coil 65 to provide heater current therefor, and the plus B potential is applied through the bifilar windings in parallel to the cathode 68. This eliminates the requirement for high voltage insulation between the heating coil 65 and cathode 68 and in the transformer normally required to provide heater current. When using a diode having a center tapped heating coil such as tube type 35Z5, the resistors 66 and 67 may be dispensed with as connection is made from the center tap of the heater directly to the cathode 68. This connection is shown in Fig. 3. The movable tap 63 permits balancing of the bridge to compensate for inaccuracies in the components.

In Fig. 2 an improved system for providing focus current from the deflection generator also is illustrated. The efficiency diode 52 is connected across the scanning coils 21 in series with a voltage regulator tube 70. The voltage across the tube 70 is applied to the focus coil 71 so that the energy from the back-kick in the coils 21 may be used for focusing. Variable resistor 72 is connected in series with coil 71 so that by adjustment of the resistor 72 the focusing current can be set at the proper value without interfering with the sweep current supplied to coils 21 and, therefore, changing the horizontal picture size. The voltage across the tube 70 remains substantially constant regardless of the current flow therethrough so that good focus is obtained at all times. To take care of changes in voltage across the coils 21 due to adjustment of the resistor 48, a small resistor 74 may be provided in series with the diode 52 and the tube 70. This prevents changes in the voltage across the diode.

In this arrangement the additional by-pass condenser 73 is provided. It is obvious that this arrangement for providing focus current can be used in the system of Fig. 1 if desired.

Figure 4:
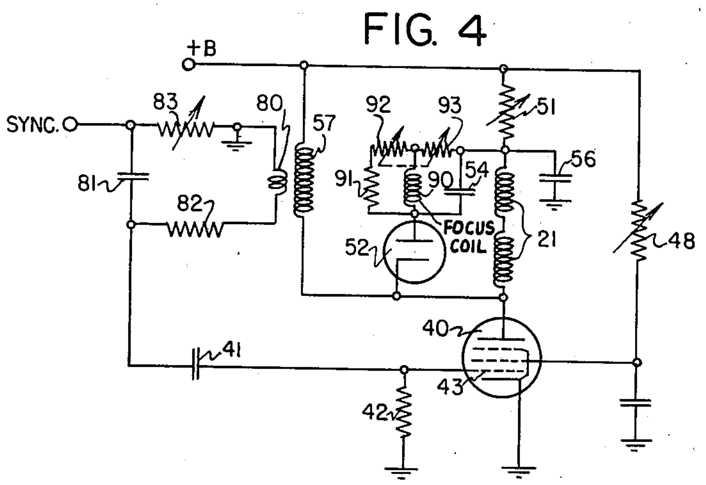
Fig. 4 is a circuit diagram of a further modification of the current generator of Fig. 1.
Figure 5:
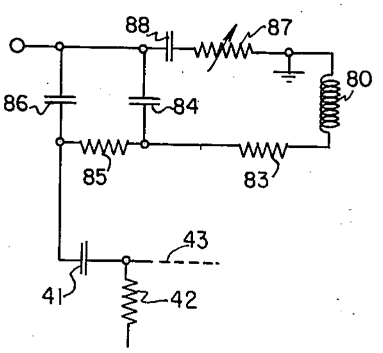
Fig. 5 illustrates an improved feedback circuit for use in the system of Fig. 4 to provide improved linearity.

In Fig. 4 there is illustrated a modified deflection generator which is self-oscillating and, therefore, does not require a separate oscillator as illustrated in Fig. 1. The amplifier 40 may be identical to that of Fig. 1 with the output circuit thereof connected to the deflecting coils 21 and the efficiency diode 52 in the same manner. The high impedance choke 57 is also provided as in Fig. 1 to provide the differential current required to produce sawtooth currents in the deflecting coils. This choke may also be of the bifilar type as described before so that it may carry heater current for the diode and at the same time serve as the primary winding in the feedback system to be described. In order to provide feedback to the amplifier, a coil 80 is inductively coupled to the choke 57. Condenser 81 and resistor 82 integrate the pulse induced in winding 80 to provide a rising sawtooth voltage which is applied to the grid 43 of the amplifier 40. Negative peaks are provided in the voltage wave by resistor 83 which may be adjusted to produce peaks of the required amplitude. This sawtooth voltage wave is similar to the voltage wave provided by the blocking oscillator and illustrated in Fig. 6*a* and causes the amplifier to be self-oscillating. Fig. 5 illustrates a modified feedback arrangement which includes a double integrating circuit to correct for distortion due to tube characteristics. The voltage applied to the grid by this circuit is illustrated by curve *c* in Fig. 6. The integrating circuit includes a first section including resistor 83 and condenser 84 and a second section including resistor 85 and condenser 86. Variable resistor 87 connected in series with condenser 88 may be adjusted to provide the negative peaks.

As indicated in Fig. 4, synchronization pulses for controlling the deflection generator can also be applied to the feedback circuit. These pulses are integrated to provide a sawtooth voltage wave which is applied to the grid 43 of the pentode. Similarly, synchronization signals may be applied to the feedback circuit as illustrated in Fig. 5. Therefore, these current generators may be held in step by the synchronization signals and are also self-oscillating so that relatively small synchronization signals are sufficient for holding the generators in step.

In Fig. 4 a modified arrangement is provided which permits control of the focusing current without interference with the load of the deflection generator. The focus coil 90 is connected in parallel with fixed resistor 91 and variable resistor 92 and in series with variable resistor 93. By ganging the variable resistors 92 and 93 and properly selecting the values thereof the focus current can be changed without changing the over-all resistance of the load. It is obvious that additional arrangements other than the arrangements shown in Figs. 2 and 4 can be used to accomplish this result.

When obtaining the focus current from the sweep generator as described above, a focus coil having a relatively large number of turns will be required. This is because the focus current available is a small fraction of the sweep current and in order to provide sufficient ampere turns for focusing the beam of a cathode ray tube a large number of turns is required. In a circuit which was constructed and which operated satisfactorily, a sweep current of approximately 0.28 of an ampere was provided and the focus current was approximately 0.035 of an ampere. This required a focus coil having 16,000 turns in order to produce about 550 ampere turns required for focusing the beam. These figures, of course, are merely illustrative but in any case a relatively large number of turns will be required.

It is seen from the above that the current generator described provides sawtooth currents having linear traces as required for horizontal deflection in a television system. As an output transformer is not required the losses are reduced and by using the diode for conserving the energy built up in the deflection coils, a very efficient system is provided. As the energy from the back-kick of the deflection coils is used to provide current for the focus coil, energy is further conserved. The elimination of the output transformer also materially reduces the cost of the generator. As the choke which provides the differentiating current will carry only very small currents, it will not be an expensive component.

The current generator which provides sweep current and also focusing current for a cathode ray tube in a television receiver, in addition to having the advantages set forth above, also has the advantage that a relatively low plus B voltage supply can be used. The generator as disclosed will provide the sweep and focus currents required from a plus B voltage supply of approximately 280 volts. In using a voltage supply operating from a standard 110 volt power source, standard rectifier doubler systems will supply the required plus B voltage. This results in a considerable saving in the power supply over systems in which a voltage tripler or other arrangement is required to provide a higher plus B voltage. As is well known, such a doubler arrangement is also preferable as filtering is easier and regulation and efficiency are better.

While there are described certain embodiments of the invention which are illustrative thereof, it is obvious that various modifications and changes can be made therein without departing from the intended scope of the invention as defined in the appended claims.

I claim:

1. A sawtooth current generator comprising an electron discharge valve having input and output electrodes, means for applying a sawtooth voltage wave to said input electrodes of said valve, an output circuit connected to said output electrodes including an inductive load, a rectifying circuit and a high impedance choke connected in parallel across said load, said valve being adapted to conduct during a portion of said sawtooth voltage wave to produce sawtooth currents in said load, said rectifying circuit including a diode in series with a resistor for providing a path for reversed current flow when said valve is not conducting to return the energy built up in said load, and said choke including a pair of bifilar windings connected in parallel to provide a differential current so that said currents through said valve and said rectifying means combine to provide a sawtooth current wave in said load.

2. A sawtooth current generator comprising an electron discharge valve having input and output electrodes, means for applying a sawtooth voltage wave to said input electrodes, an inductive load connected to said output electrodes of said valve, said valve being adapted to conduct during a portion of said sawtooth voltage wave to provide sawtooth currents in said load, a diode connected across said load to provide reversed current flow therein, said diode including a heater, a choke including a pair of bifilar windings which are connected in parallel across said load to provide a path for the differential current required to provide a sawtooth current wave in said load, and a circuit including said bifilar windings for providing current to said heater of said diode.

3. A sawtooth current generator comprising an electron discharge valve having input and output electrodes, means for applying a sawtooth voltage wave to said input electrodes, a source of potential, an inductive load connected to said output electrodes of said valve and to said source of potential, said valve being adapted to conduct during a portion of said sawtooth voltage wave to provide sawtooth currents in said load, a diode connected across said load to provide reversed current flow therein, said diode including a plate, a cathode and a heater, a choke including a pair of bifilar windings, a source of alternating current, a resistor connected across said source of alternating current and also connected to said windings, said windings being connected to said heater to provide current therefor, said resistor including a movable tap connected to said source of potential, and a pair of resistors for individually connecting said windings to said cathode so that said windings are connected in parallel to provide a path for the differential current required to provide a sawtooth current wave in said load.

4. A sawtooth current generator comprising an electron discharge valve having input and output electrodes, means for applying a sawtooth voltage wave to said input electrodes, a source of potential, an inductive load connected to said output electrodes of said valve and to said source of potential, said valve being adapted to conduct during a portion of said sawtooth voltage wave to provide sawtooth currents in said load, a diode connected across said load to provide reversed current flow therein, said diode including a plate, a cathode and a center tapped heater, a choke including a pair of bifilar windings, a source of alternating current, and a resistor connected across said source of alternating current and also connected to said windings, said windings being connected to said heater to provide current therefor, said resistor including a movable tap connected to said source of potential, said center tap of said heater being connected to said cathode of said diode so that said windings are connected in parallel to provide a path for the differential current required to provide a current of sawtooth wave form in said load.

5. A sawtooth current generator comprising an electron discharge valve having input and output electrodes, an inductive load, a source of potential, an output circuit connecting said output electrodes to said inductive load and said source of potential, rectifying means and a high impedance choke connected in parallel across said load, and a feedback circuit inductively coupled to said choke and connected to said input electrodes, said valve being rendered conducting when a voltage of a predetermined value is applied to the input electrodes thereof, said rectifying means providing a path for reversed current flow when said valve is not conducting to return the energy built up in said load, and said choke providing a differential current so that said currents through said load combine to provide a current of sawtooth wave form, said feedback circuit converting the voltage pulse wave appearing in said choke to a sawtooth wave to thereby make said generator self-oscillating.

6. In a television system including a cathode ray tube, current generator means for energizing focus and deflecting coils for the tube including in combination, an electron discharge valve having input and output electrodes, a source of potential, an output circuit connecting said output electrodes of said valve to said deflecting coils and to said source of potential, a rectifying circuit and a high impedance choke connected in parallel across said deflecting coils, and a feed back circuit inductively coupled to said choke and connected to said input electrodes of said valve to provide oscillations therein, said rectifying circuit including a diode connected in series with said focus coil to provide a path for reverse current flow through said deflection coils for energizing said focus coil, said choke providing a differential current so that the current through said deflecting coils is of sawtooth wave form, said feed back circuit converting the voltage pulse wave appearing in said choke to a sawtooth voltage wave at said input electrodes.

7. In a television system including a cathode ray tube, current generator means for energizing focus and deflecting coils for the tube including in combination, an electron discharge valve having input and output electrodes, a source of potential, an output circuit connecting said output electrodes of said valve to said deflecting coils and to said source of potential, a rectifying circuit and a high impedance choke connected in parallel across said deflecting coils, and a feed back circuit including a coil inductively coupled to said choke and an integrating circuit connected to said input electrodes of said valve to provide oscillations therein, said rectifying circuit including a diode connected in series with said focus coil to provide a path for reversed current flow through said deflection coils for energizing said focus coil, said choke providing a differential current so that the current through said deflecting coils is of sawtooth wave form, said integrating circuit converting the voltage pulse wave appearing in said choke to a sawtooth voltage wave at said input electrodes.

8. In a television system including deflecting coils for producing a moving magnetic field and means for deriving synchronization pulses for controlling the movement of said field, a sawtooth current generator comprising an electron discharge valve having input and output electrodes, a source of potential, an output circuit connecting said output electrodes to said deflecting coils and to said source of potential, rectifying means and a high impedance choke connected in parallel across said deflecting coils, a feedback circuit including a coil inductively coupled to said choke and an integrating circuit connected to said input electrodes, said valve being rendered conducting when a voltage of a predetermined value is applied to the input electrodes thereof, said rectifying means providing a path for reversed current flow when said valve is not conducting to return the energy built up in said deflecting coils, said choke providing a differential current so that said currents through said deflecting coils combine to provide a current of sawtooth wave form, said integrating circuit being adapted to convert a voltage pulse wave to a sawtooth wave for exciting said valve, and means for applying said synchronization pulses to said integrating circuit so that a sawtooth wave is applied to said valve in response thereto.

9. In a television system including a cathode ray tube and focus and deflecting coils for directing the beam of said tube, a sawtooth current generator comprising an electron discharge valve having input and output electrodes, means for applying a sawtooth voltage wave to said input electrodes of said valve, a source of potential, an output circuit for connecting said output electrodes of said valve to said deflecting coils and to said source of potential, and a rectifying circuit and a high impedance choke connected in parallel across said deflecting coils, said valve being adapted to conduct during a portion of said sawtooth voltage wave to produce sawtooth currents in said deflecting coils, said rectifying circuit including a diode and resistance means connected in series to provide a path for reversed current flow through said deflecting coils, said choke providing a differential current so that said currents through said deflecting coils combine to provide a curent of sawtooth wave form, said focus coil being connected across said resistance means to be energized by the voltage developed thereacross from the reversed current flow through said deflecting coils.

10. In a television system including a cathode ray tube and focus and deflecting coils for directing the beam of said tube, a sawtooth current generator comprising an electron discharge valve having input and output electrodes, means for applying a sawtooth voltage wave to said input electrodes of said valve, a source of potential, an output circuit for connecting said output electrodes of said valve to said deflecting coils and to said source of potential, a rectifying circuit and a high impedance choke connected in parallel across said deflecting coils, said valve being adapted to conduct during a portion of said sawtooth voltage wave to produce sawtooth currents in said deflecting coils, said rectifying circuit including a diode and a voltage regulator tube connected in series to provide a path for reversed current flow when said valve is not conducting to return the energy built up in said deflecting coils, said choke providing a differential current so that said currents through said valve and said rectifying means combine to provide a sawtooth current wave in said deflecting coils, and a variable resistor connected in series with said focus coil across said voltage regulator tube to be energized by the voltage developed thereacross from the reversed current flow through said deflecting coils.

11. A sawtooth current generator comprising an electron discharge valve having input and output electrodes, means for applying a sawtooth voltage wave to said input electrodes, a source of potential, an inductive load connected to said output electrodes of said valve and to said source of potential, said valve being adapted to conduct during a portion of said sawtooth voltage wave to provide sawtooth currents in said load, a diode connected across said load to provide reversed current flow therein, said diode including a plate, a cathode and a heater, a choke including a pair of bifilar windings, a source of alternating current, a resistor bridged across said source of alternating current and connected to said windings, said windings being connected to said heater to provide current therefor, said resistor including a movable tap connected to said source of potential, and means connecting said cathode to said heater so that said cathode is maintained at substantially the mean potential point of said heater.

12. In a television system including a cathode ray tube and focus and deflecting coils for directing the beam of said tube, a sawtooth current generator comprising an electron discharge valve having input and output electrodes, means for applying a sawtooth voltage wave to said input electrodes of said valve, a source of potential, an output circuit for connecting said output electrodes of said valve to said deflecting coils and to said source of potential, and a circuit bridged across said deflecting coils providing a path for reversed current flow through said deflecting coils to return the energy built up therein, said circuit bridged across said deflecting coils including a rectifying element and said focus coil connected in series so that said focus coil is energized from said reverse current flow from said deflecting coils.

KURT SCHLESINGER.

REFERENCES CITED

The following references are of record in the file of this patent:

UNITED STATES PATENTS

| Number | Name | Date |
|---|---|---|
| 2,280,733 | Tolson | Apr. 21, 1942 |
| 2,370,426 | Schade | Feb. 27, 1945 |
| 2,436,447 | Packard | Feb. 24, 1948 |
| 2,440,418 | Tourshou | Apr. 27, 1948 |
| 2,445,017 | Boadle et al. | July 13, 1948 |
| 2,451,641 | Torsch | Oct. 19, 1948 |
| 2,470,197 | Torsch | May 17, 1949 |